United States Patent
Tagawa et al.

(10) Patent No.: US 7,963,105 B2
(45) Date of Patent: Jun. 21, 2011

(54) EXHAUST PURIFICATION SYSTEM FOR INTERNAL COMBUSTION ENGINE

(75) Inventors: Yoshio Tagawa, Anjo (JP); Keisuke Tashiro, Okazaki (JP); Seiji Kikuchi, Okazaki (JP); Takehisa Fujita, Kariya (JP); Mizuki Anai, Anjo (JP); Kazuhito Kawashima, Okazaki (JP); Masahiro Tsuda, Okazaki (JP); Jian Wang, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 687 days.

(21) Appl. No.: 12/076,082

(22) Filed: Mar. 13, 2008

(65) Prior Publication Data
US 2008/0295490 A1    Dec. 4, 2008

(30) Foreign Application Priority Data
May 31, 2007   (JP) .................... 2007-145304

(51) Int. Cl.
*F01N 3/00*   (2006.01)
(52) U.S. Cl. ............... 60/286; 60/277; 60/295; 60/301; 60/303
(58) Field of Classification Search ............ 60/277, 60/286, 295, 297, 301, 303
See application file for complete search history.

(56) References Cited

U.S. PATENT DOCUMENTS

| | | | | |
|---|---|---|---|---|
| 5,996,338 | A * | 12/1999 | Hirota | 60/285 |
| 6,279,603 | B1 * | 8/2001 | Czarnik et al. | 137/339 |
| 7,571,599 | B2 * | 8/2009 | Hirata | 60/286 |
| 7,607,292 | B2 * | 10/2009 | Kobayashi | 60/286 |
| 7,703,276 | B2 * | 4/2010 | Ueno | 60/286 |
| 7,743,603 | B2 * | 6/2010 | Nishina et al. | 60/286 |

FOREIGN PATENT DOCUMENTS

| | | | | |
|---|---|---|---|---|
| JP | | 3514230 B2 | 1/2004 | |
| WO | WO 2007/029784 | * | 3/2007 | 60/286 |

* cited by examiner

Primary Examiner — Binh Q Tran
(74) Attorney, Agent, or Firm — Birch, Stewart, Kolasch & Birch, LLP

(57) ABSTRACT

An exhaust purification system includes a catalyst disposed in an exhaust path of an internal combustion engine; a fuel pump that supplies fuel to a common rail; an exhaust-side fuel injection valve that is interposed in the exhaust path so as to be located upstream of the catalyst and injects into the exhaust path the fuel supplied from the fuel pump; and estimation section that estimates a clogging degree of an injection port of the exhaust-side fuel injection valve on the basis of fluctuations in pressure of the common rail and those in revolution speed of the internal combustion engine at the time of fuel injection by the exhaust-side fuel injection valve.

4 Claims, 6 Drawing Sheets

EXHAUST PURIFICATION SYSTEM FOR INTERNAL COMBUSTION ENGINE

BACKGROUND OF THE INVENTION

1. Field of the Invention

The present invention relates to an exhaust purification system for an internal combustion engine, and more specifically, to a technology of addressing clogging of an injection port of a fuel injection valve that is interposed in an exhaust path.

2. Description of the Related Art

A NOx (nitrogen oxide) absorption catalyst and a DPF (diesel particulate filter) are well known as devices for purifying exhaust from diesel engines.

The DPF collects PM (particulate matter) contained in the exhaust. It is also known to place an oxidation catalyst in the upstream of the DPF in order to remove the PM that is collected by and deposited in the DPF. In this method, the PM collected by the DPF is burned by sending fuel into the oxidation catalyst and raising the exhaust temperature.

The NOx absorption catalyst absorbs NOx contained in the exhaust in a lean atmosphere. According to a conventional method of regenerating the NOx absorption catalyst, the NOx absorption catalyst is supplied with a reducing agent such as fuel. The NOx absorbed by the NOx absorption catalyst is then desorbed, reduced and detoxified.

In order to supply fuel to the oxidation catalyst and the NOx absorption catalyst, a well-known method disposes a fuel injection valve (exhaust-side fuel injection valve) in the upstream of these catalysts, and injects the fuel into the exhaust path.

In this method, a fuel injection amount to be supplied by the exhaust-side fuel injection valve is set to an optimum amount based upon operation conditions, such as engine revolution speed. However, in respect of the exhaust purification system with the fuel injection valve located in the exhaust path, there is a case where soot contained in the exhaust clogs up an injection port of the exhaust-side fuel injection valve, which causes an error in an actual fuel injection amount in comparison with a preset fuel injection amount. Given this situation, a system has been developed, in which a pressure sensor is interposed in a fuel supply path through which fuel is sent to the exhaust-side fuel injection valve. Based upon the pressure detected by the pressure sensor, it is estimated whether the injection port is in a state where it is clogged beyond a tolerance limit (hereinafter, such a state is referred to as a valve clogging state). This system is disclosed in Japanese Patent No. 3514230 (hereinafter, referred to as Document 1).

On the other hand, the system described in Document 1 requires to newly install a pressure sensor for estimation of the valve clogging state. This increases components and raises costs. Moreover, if the pressure sensor does not operate properly, it is impossible to estimate the valve clogging state.

SUMMARY OF THE INVENTION

An aspect of the present invention is directed to an exhaust purification system for an internal combustion engine having a common rail in a fuel supply system, comprising a catalyst interposed in an exhaust path of the internal combustion engine; a fuel pump that supplies fuel to the common rail; an exhaust-side fuel injection valve that is interposed in an exhaust path so as to be located upstream of the catalyst and injects into the exhaust path the fuel supplied from the fuel pump; common rail pressure-detecting means that detects pressure in the common rail; revolution speed-detecting means that detects revolution speed of the internal combustion engine; and estimation means that estimates a clogging degree of an injection port of the exhaust-side fuel injection valve during fuel injection of the exhaust-side fuel injection valve, on the basis of fluctuations in the pressure in the common rail which is detected by the common rail pressure-detecting means and fluctuations in the revolution speed of the internal combustion engine which is detected by the revolution speed-detecting means.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the present invention will be described below with reference to the attached drawings.

Figure 1:
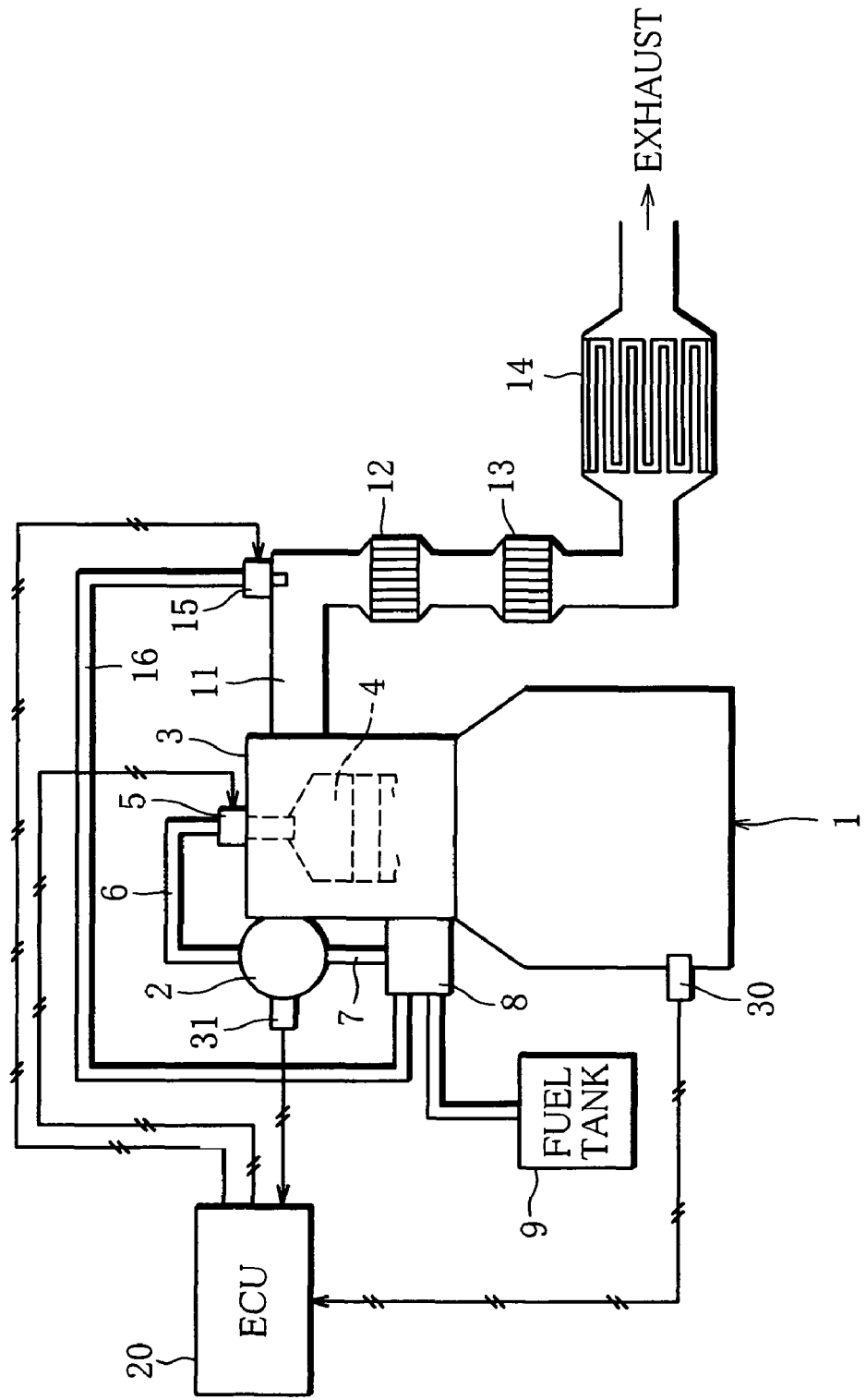
FIG. 1 is a schematic configuration view of fuel and exhaust systems of a diesel engine according to embodiments of the invention.

FIG. 1 is a schematic configuration view of fuel and exhaust systems of an engine 1 (internal combustion engine) in which an exhaust purification system according to the present invention is applied.

The engine 1 of the embodiments is a multicylinder diesel engine with a common rail 2. The engine 1 has a cylinder head 3 in which an electromagnetic in-cylinder fuel injection valves 5 are provided to cylinders so as to face respective combustion chambers 4. Each in-cylinder fuel injection valve 5 is connected to the common rail 2 through a high-pressure pipe 6. The common rail 2 is connected to a fuel pump 8 through a high-pressure pipe 7. The fuel pump 8 is driven by the engine 1 and has a function of supplying the common rail 2 with fuel that is stored in a fuel tank 9. The fuel supplied to the common rail 2 is stored in a high-pressure state, and is injected from the in-cylinder fuel injection valves 5 into the respective combustion chambers 4 during operation of the engine 1.

An oxidation catalyst 12, a NOx absorption catalyst 13, and a DPF 14 are interposed in an exhaust pipe 11 of the engine 1 in order from the upstream side. The oxidation catalyst 12 is formed by carrying catalyzing noble metal, such as platinum (Pt), palladium (Pd), and rhodium (Rh), on porous walls that form exhaust flow channels. The oxidation catalyst 12 acts to oxidize and convert CO and HC contained in exhaust to $CO_2$ and $H_2O$, respectively, and produce $NO_2$ by oxidizing NO in the exhaust.

The NOx absorption catalyst 13 is, for example, formed by carrying a NOx absorbent, such as barium (Ba) and potassium (K), on a carrier containing noble metal, such as platinum (Pt) and palladium (Pd). The NOx absorption catalyst 13 absorbs NOx in a lean air-fuel ratio atmosphere (oxidative atmosphere). The NOx absorption catalyst 13 desorbs the absorbed NOx in a rich air-fuel ratio atmosphere (reducing atmosphere), and causes the desorbed NOx to react with HC and CO in the exhaust, to thereby reduce the NOx.

The DPF 14 has a structure, for example, in which upstream and downstream sides of a path of a honeycomb carrier are alternately closed with plugs. The DPF 14 functions to collect PM in the exhaust. The DPF 14 is formed by carrying catalyzing noble metal, such as platinum (Pt), palladium (Pd), and rhodium (Rh), on porous walls that form exhaust flow channels.

A fuel injection valve disposed in the exhaust pipe (an exhaust path fuel injection valve; hereinafter, referred to as an exhaust-side fuel injection valve) 15 is placed upstream of the oxidation catalyst 12. The exhaust-side fuel injection valve 15 is connected to a fuel pump 8 through a high-pressure pipe 16 and supplied with fuel from the fuel pump 8. The exhaust-side fuel injection valve 15 functions to inject the supplied fuel from an injection port into the exhaust pipe 11.

An ECU 20 is a controller for implementing comprehensive controls including operation control of the engine 1. The ECU 20 is constructed, including an input/output device, a storage device (ROM, RAM, nonvolatile RAM, etc.), a central processing unit (CPU), and the like.

Various sensors are connected to an input side of the ECU 20, including a crank angle sensor (revolution speed-detecting means) 30 that detects a crank angle of the engine 1, a common rail pressure sensor (common rail pressure-detecting means) 31 that detects pressure in the common rail 2, an airflow sensor, not shown, which detects an intake flow rate, an accelerator position sensor that detects a depression amount of an accelerator pedal, an exhaust temperature sensor that detects exhaust temperature, etc. Information detected by these sensors is entered into the ECU 20.

Connected to an output side of the ECU 20 are various devices including an intake throttle valve, not shown, and the like, in addition to the above-mentioned in-cylinder fuel injection valve 5. The ECU 20 calculates a fuel injection amount, fuel injection timing, and the like, on the basis of the detected information that is transmitted from the various sensors, and outputs calculation results to the various devices. In this way, the ECU 20 controls the devices, such as the in-cylinder fuel injection valve 5 and the intake throttle valve, with proper timing.

If the oxidation catalyst 12 is located upstream of the DPF 14 as described above, $NO_2$ is emitted from the oxidation catalyst 12 during normal operation, that is, in a lean air-fuel ratio atmosphere. A portion of the $NO_2$ flows into the DPF 14 after passing through the NOx absorption catalyst 13, and then reacts with soot, which is a carbon component contained in the PM collected by and deposited in the DPF 14, to oxidize the soot. The oxidized soot turns into $CO_2$ and is removed from the DPF 14. In this manner, the DPF 14 is continuously regenerated (continuous regeneration).

In the above-described continuous regeneration, occasionally, the regeneration of the DPF 14 is not satisfactorily achieved, depending upon operation conditions of the engine 1. Therefore, the ECU 20 has a function of estimating a deposition amount of the PM in the DPF 14, for example, on the basis of differential pressure between the upstream side and the downstream side of the DPF 14 and an exhaust flow rate, and implementing forced regeneration when an estimated deposition amount becomes equal to or more than an allowable amount. When the forced regeneration is carried out, the ECU 20 causes the exhaust-side fuel injection valve 15 to inject fuel into the exhaust pipe 11, controlling the exhaust-side fuel injection valve 15, to thereby supply the fuel to the oxidation catalyst 12. The fuel supplied to the oxidation catalyst 12 is oxidized in the oxidation catalyst 12 and increases the temperature of the exhaust that flows into the DPF 14. As a result, the PM deposited in the DPF 14 is burned, and the DPF 14 is regenerated.

The engine 1 has a NOx purge function that desorbs the NOx absorbed by the NOx absorption catalyst 13. When the NOx purge is carried out, the ECU 20 causes the exhaust-side fuel injection valve 15 to inject fuel into the exhaust pipe 11, controlling the exhaust-side fuel injection valve 15 according to the detected information transmitted from the various sensors, namely, the operation conditions of the engine 1. In this way, the ECU 20 enriches the air-fuel ratio of the exhaust that enters the NOx absorption catalyst 13.

Particularly, the engine 1 of the embodiments has a valve clogging estimation function that estimates a clogging degree of the injection port of the exhaust-side fuel injection valve 15, and a correction function that corrects a preset injection amount of fuel to be injected from the exhaust-side fuel injection valve 15 according to the estimated clogging degree of the injection port. Valve clogging estimation control and correction control for exerting the valve clogging estimation function and the correction function will be described below in detail with reference to FIG. 2.

Figure 2:
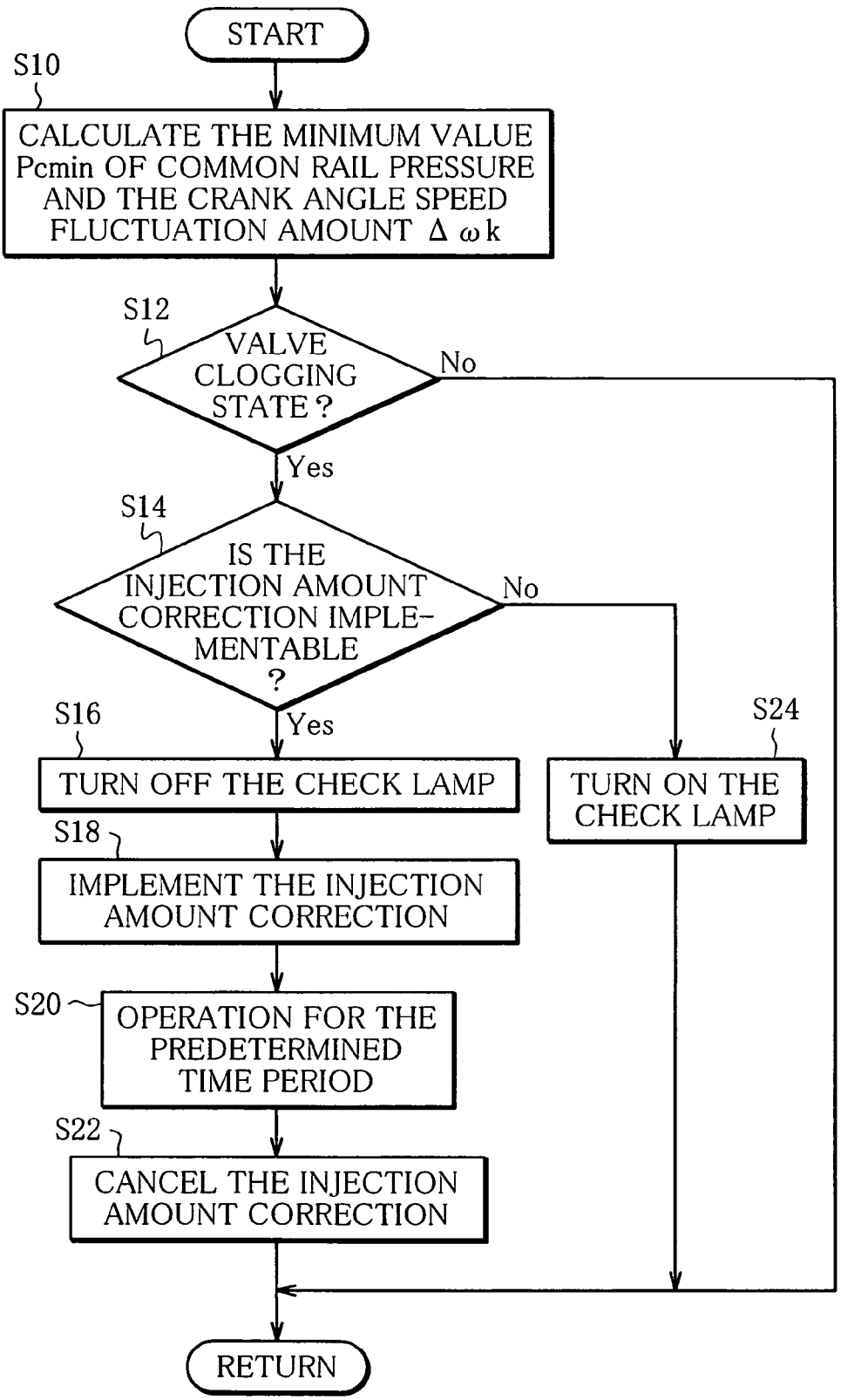
FIG. 2 is a flowchart of valve clogging estimation and fuel-injection correction control which are carried out by an ECU in a first embodiment of the invention.

FIG. 2 is a flowchart of the valve clogging estimation control and the correction control which are implemented by the ECU 20 in a first embodiment of the invention. A routine illustrated in FIG. 2 is carried out at the same time as the fuel injection from the exhaust-side fuel injection 15.

First, in Step S10, the ECU 20 obtains common rail pressure Pc from the common rail pressure sensor 31 and finds a minimum value Pcmin of the common rail pressure Pc that is temporarily reduced along with the fuel injection from the exhaust-side fuel injection valve 15. The ECU 20 also calculates crank angle speed $\omega k$ on the basis of transition of crank angle $\theta k$ obtained by the crank angle sensor 30, and finds crank angle speed fluctuation amount $\Delta \omega k$ that is maximum fluctuation width of the crank angle speed $\omega k$ fluctuated along with the fuel injection from the exhaust-side fuel injection valve 15. The ECU 20 then advances the procedure to Step S12.

In Step S12, the ECU 20 makes a determination as to whether the exhaust-side fuel injection valve 15 is in a valve clogging state (estimation means). More specifically, the ECU 20 determines whether the minimum value Pcmin of the common rail pressure, which has been obtained in Step S10, is equal to or more than an allowable value Pc1 (first preset value). The ECU 20 simultaneously determines whether the crank angle speed fluctuation amount $\Delta \omega k$ is equal to or less than an allowable value $\omega k1$ (second preset value). If at least one of these two conditions is satisfied, the ECU 20 determines that the exhaust-side fuel injection valve 15 is in the valve clogging state, that is, a state where the injection port is clogged beyond a tolerance limit. If neither of the conditions is satisfied, the ECU 20 determines that the exhaust-side fuel injection valve 15 is not in the valve clogging state. If it is determined that the exhaust-side fuel injection valve 15 is not in the valve clogging state, the routine returns to the start. If it is determined that the exhaust-side fuel injection valve 15 is in the valve clogging state, the ECU 20 advances the procedure to Step S14.

In Step S14, the ECU 20 makes a determination as to whether the injection amount correction is implementable. To be concrete, for example, while the ECU 20 is implementing the fuel injection control on the exhaust-side fuel injection valve 15, if the common rail pressure Pc is not decreased at all or if the crank angle speed fluctuation amount $\Delta\omega k$ is substantially zero, the ECU 20 determines that the injection amount correction is not implementable. In this case, it is assumed that the fuel injection from the exhaust-side fuel injection valve 15 is impossible to be carried out. When determining that the injection amount correction is implementable, the ECU 20 advances the procedure to Step S16.

In Step S16, the ECU 20 turns off or keeps off a check lamp mentioned later, and advances the procedure to Step S18.

Figure 5:
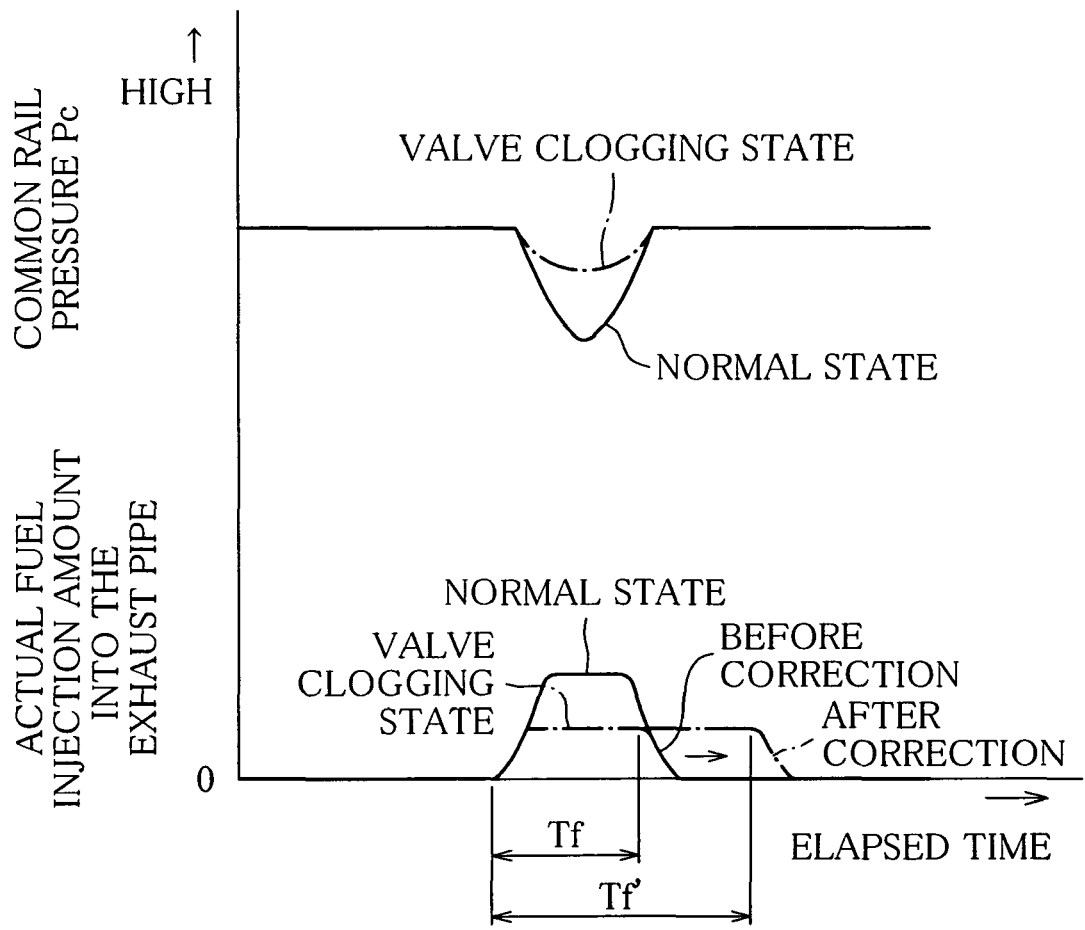
FIG. 5 is a time chart showing transition of an actual injection amount in a period of fuel-injection correction control.

In Step S18, the ECU 20 implements the correction of the preset injection amount of the exhaust-side fuel injection valve 15 (correction means). More concretely, the ECU 20 reads out a fuel injection time period correction coefficient Cft1 corresponding to the minimum value Pcmin of the common rail pressure from a map that has previously been studied and stored through an experiment or the like. The ECU 20 similarly reads out a fuel injection time period correction coefficient Cft2 corresponding to the crank angle speed fluctuation amount $\Delta\omega k$ from another map. The ECU 20 corrects preset fuel injection time period Tf to corrected fuel injection time period Tf' by multiplying the preset fuel injection time period Tf by the larger one among the fuel injection time period correction coefficients Cft1 and Cft2. As illustrated in FIG. 5, the ECU 20 implements the fuel injection into the exhaust pipe 11 for the duration of the corrected fuel injection time period Tf' at the time of the fuel injection from the exhaust-side fuel injection valve 15. The ECU 20 subsequently advances the procedure to Step S20.

In Step S20, the ECU 20 repeatedly carries out, for a predetermined time period, the fuel injection from the exhaust-side fuel injection valve 15 into the exhaust pipe 11 according to the injection amount that has been obtained by correcting the preset injection amount in Step S18. The predetermined time period may be properly set, for example, according to an operating duration of the engine 1, the number of times of fuel injection from the exhaust-side fuel injection valve 15, etc. The ECU 20 then advances the procedure to Step S22.

In Step S22, the ECU 20 cancels the correction of the preset injection amount, which has been carried out in Step S18. The routine then returns to the start.

If ECU 20 determines in Step S14 that the injection amount correction is not implementable, the ECU 20 advances the procedure to Step S24.

In Step S24, the ECU 20 turns on the check lamp. The check lamp acts to inform a driver that the injection amount correction is not implementable. The routine then returns to the start.

Figure 3:
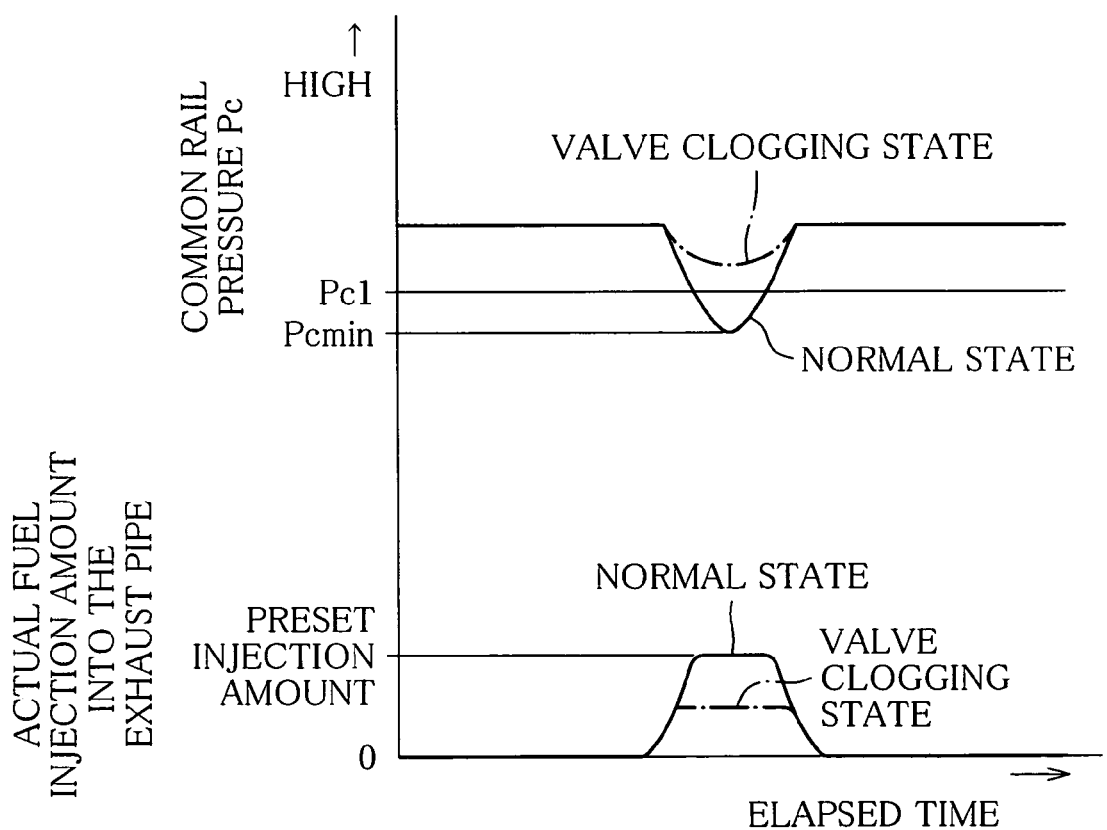
FIG. 3 is a time chart showing one example of transition of common rail pressure in a period of fuel injection into an exhaust pipe.
Figure 4:
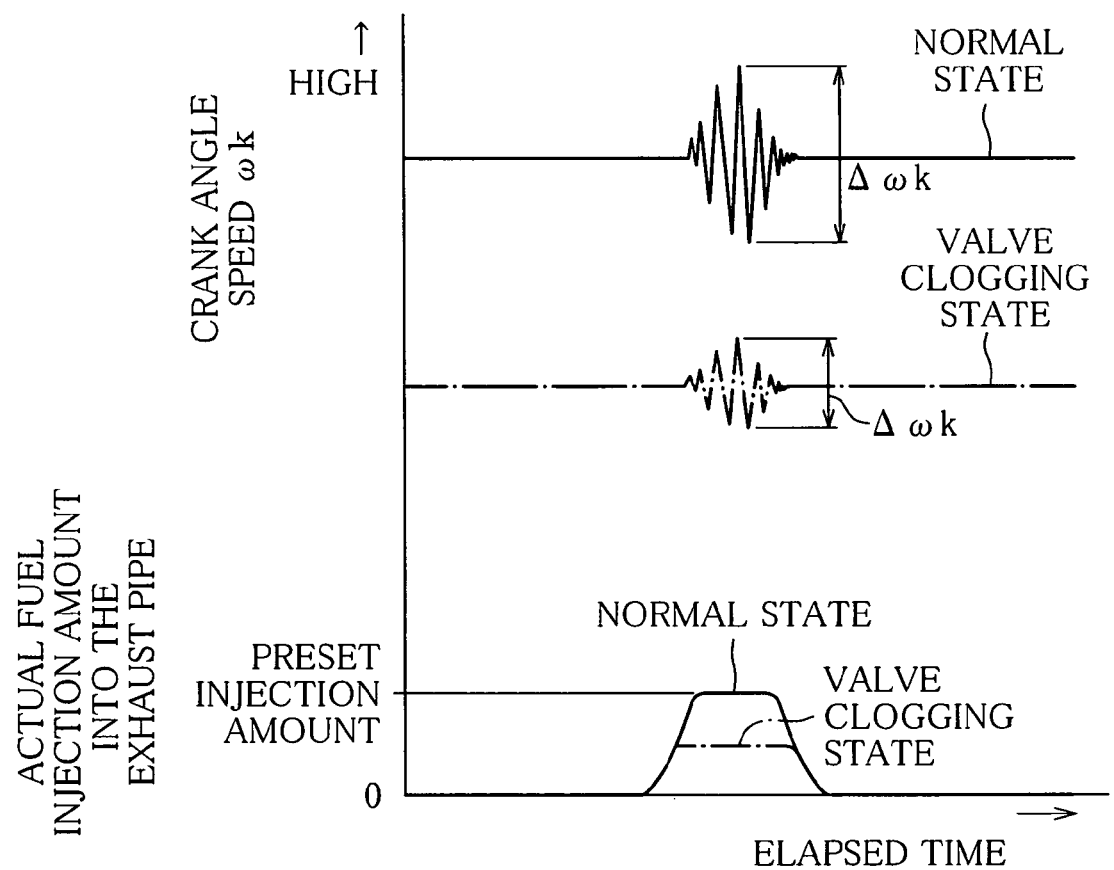
FIG. 4 is a time chart showing one example of transition of crank angle speed in the period of the fuel injection into the exhaust pipe.

As described above, according to the first embodiment, if the minimum value Pcmin of the common rail pressure Pc is equal to or more than the allowable vale Pc1 at the time of the fuel injection by the exhaust-side fuel injection valve 15, or if the crank angle speed fluctuation amount $\Delta\omega k$ is equal to or less than the allowable value $\omega k1$, the ECU 20 determines that the exhaust-side fuel injection valve 15 is in the valve clogging state. The determination as to the valve clogging state will be described below in detail with reference to FIGS. 3 and 4. FIG. 3 is a time chart showing one example of transition of the common rail pressure Pc in a period when fuel is injected into the exhaust pipe 11. FIG. 4 is a time chart showing one example of transition of the crank angle speed $\omega k$ in the period when fuel is injected into the exhaust pipe 11.

If the exhaust-side fuel injection valve 15 is in the valve clogging state, the actual injection amount of the fuel injected from the exhaust-side fuel injection valve 15 is less than the preset injection amount. This reduces the amount of the fuel supplied from the fuel pump 8 to the exhaust-side fuel injection valve 15. Since the fuel pump 8 is used for sending the fuel both to the exhaust-side fuel injection valve 15 and the common rail 2 at the same time, the amount of the fuel supplied to the common rail 2 becomes larger as a result of the reduction in the fuel supply amount to the exhaust-side fuel injection valve 15. As illustrated in FIG. 3, when the exhaust-side fuel injection valve 15 is in the valve clogging state, the pressure in the common rail 2 in the period of the fuel injection into the exhaust pipe 11 is restrained from being reduced. Since the reduction of pressure in the common rail 2 is restrained, fluctuations in amount of the fuel supplied to the in-cylinder fuel injection valve 5 are restrained during the fuel injection into the exhaust pipe 11. Therefore, as illustrated in FIG. 4, when the exhaust-side fuel injection valve 15 is in the valve clogging state, the fluctuation amount of the engine revolution speed becomes small. Accordingly, proper setting of the allowable value Pc1 and the allowable value $\omega k1$ makes it possible to estimate whether the exhaust-side fuel injection valve 15 is in the valve clogging state on the basis of the minimum value Pcmin of the common rail pressure Pc or the crank angle speed fluctuation amount $\Delta\omega k$ in the period of the fuel injection into the exhaust pipe 11.

The first embodiment applies the common rail pressure sensor 31 and the crank angle sensor 30, which have already been widely used for diesel engines. Accordingly, it is possible to estimate the clogging degree of the injection port of the exhaust-side fuel injection valve 15 without newly adding a pressure sensor and with a cost increase being restrained or avoided. The first embodiment estimates the valve clogging state by using the common rail pressure sensor 31 and the crank angle sensor 30 together. The valve clogging state can be estimated even by either one of these sensors. Therefore, the embodiment improves reliability in addressing a malfunction of the sensors and the like, and also enhances estimation accuracy.

The first embodiment makes a correction for increase with respect to the fuel injection time period as shown in FIG. 5 according to the clogging degree of the injection port of the exhaust-side fuel injection valve 15, which is determined by the minimum value Pcmin of the common rail pressure and the crank angle speed fluctuation amount $\Delta\omega k$. As a result, a proper fuel injection amount is secured, which prevents insufficient fuel injection from the exhaust-side fuel injection valve 15. It is consequently possible to accurately control the fuel injection into the exhaust pipe 11 at the time of forced regeneration, NOx purge process, etc.

A second embodiment of the present invention will be described below with reference to FIG. 6.

Figure 6:
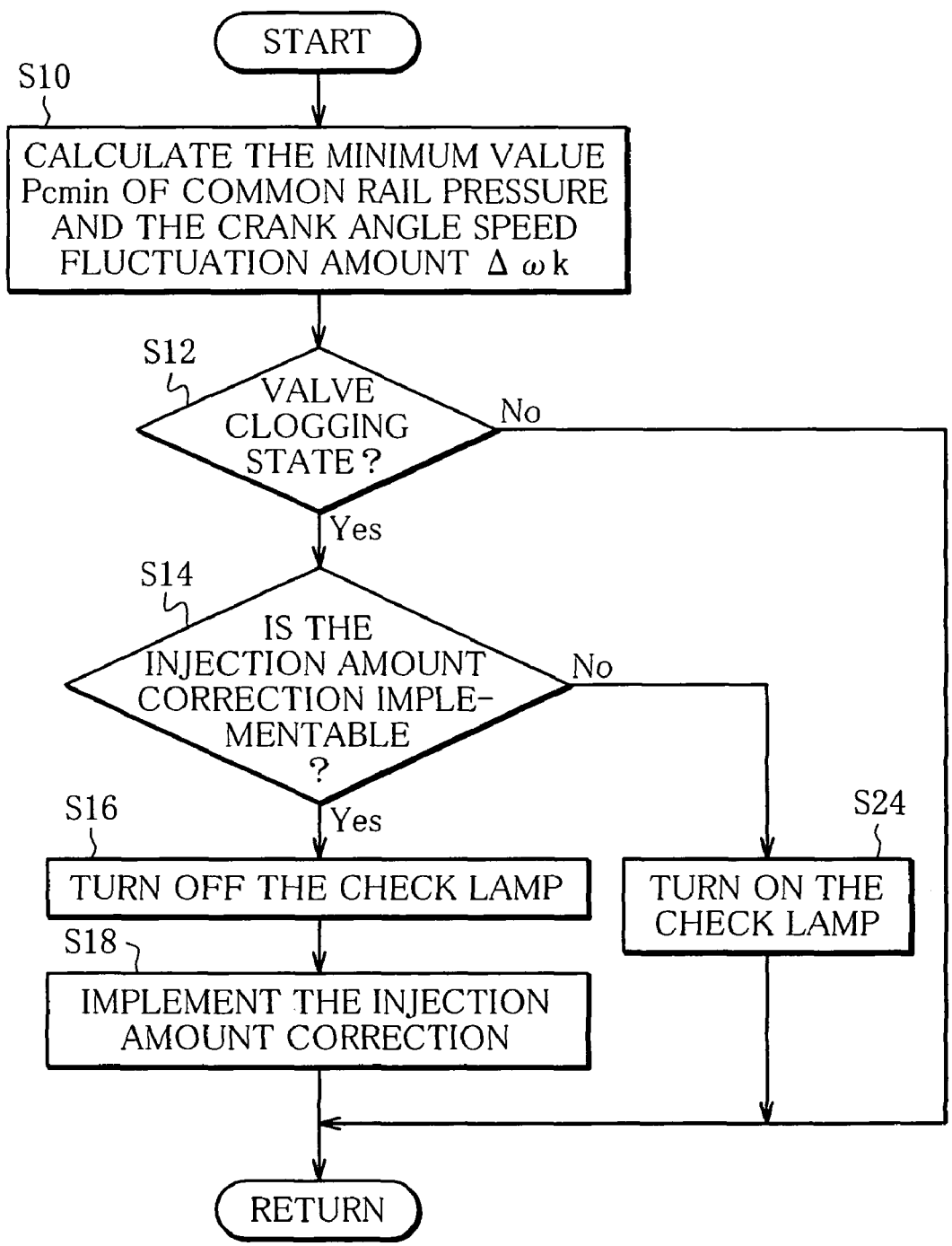
FIG. 6 is a flowchart of valve clogging estimation and fuel-injection correction control which are carried out by an ECU in a second embodiment of the invention.

FIG. 6 is a flowchart of the valve clogging estimation and the fuel-injection correction control which are implemented by the ECU 20 in the second embodiment of the invention. The descriptions below are only about differences from the first embodiment illustrated in FIG. 2.

According to the second embodiment, the ECU 20 implements control so that the routine returns to the start after Step S18 as shown in FIG. 6.

By implementing the control as described above, the ECU 20 calculates a correction amount of the injection amount each time the fuel is injected into the exhaust pipe 11 in the second embodiment, instead of repeatedly injecting the fuel for a predetermined period according to the fuel injection amount based upon the only-one-time correction as in the first embodiment. In the second embodiment, therefore, when the exhaust-side fuel injection valve 15 is in the valve clogging state, the valve clogging state is quickly estimated, and the fuel injection amount into the exhaust pipe 11 is promptly corrected. Consequently, the correction accuracy of the fuel injection amount is more enhanced.

In the above embodiments, the invention is applied to the engine 1 in which the exhaust-side fuel injection valve 15 is used for both the forced regeneration and the NOx purge. However, the application of the invention is not limited to the above-described engine 1. For example, the invention may also be applied to an engine in which fuel is injected into an exhaust pipe for the purpose of either the forced regeneration or the NOx purge, or for another use such as S purge.

In the embodiments, fuel is supplied directly from the fuel pump 8 to the exhaust-side fuel injection valve 15. It is also possible, however, to connect the exhaust-side fuel injection valve 15 to the common rail 2 and supply fuel from the common rail 2 to the exhaust-side fuel injection valve 15.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification system for an internal combustion engine having a common rail in a fuel supply system, comprising:
   a catalyst interposed in an exhaust path of the internal combustion engine;
   a fuel pump that supplies fuel to the common rail;
   an exhaust-side fuel injection valve that is interposed in an exhaust path so as to be located upstream of the catalyst and injects into the exhaust path the fuel supplied from the fuel pump;
   common rail pressure-detecting means for detecting pressure in the common rail;
   revolution speed-detecting means for detecting revolution speed of the internal combustion engine; and
   estimation means for estimating a clogging degree of an injection port of the exhaust-side fuel injection valve during the fuel injection of the exhaust-side fuel injection valve, on the basis of fluctuations in the pressure in the common rail, within a period when the fuel is injected into the exhaust path, which is detected by the common rail pressure-detecting means and fluctuations in the revolution speed of the internal combustion engine, within the period when the fuel is injected into the exhaust path, which is detected by the revolution speed-detecting means.

2. The exhaust purification system for an internal combustion engine according to claim 1,
   wherein the estimation means estimates that a clogging degree of the injection port is beyond a tolerance limit when a minimum value of the pressure in the common rail, which is detected by the common rail pressure-detecting means, is equal to or more than a first preset value or when a maximum fluctuation amount of the revolution speed, which is detected by the revolution speed-detecting means, is equal to or less than a second preset value, during fuel injection by the exhaust-side fuel injection valve, and also estimates that the clogging degree of the injection port is not beyond the tolerance limit when the minimum value of the pressure in the common rail is less than the first preset value, and the maximum fluctuation amount of the revolution speed is more than the second preset value.

3. The exhaust purification system for an internal combustion engine according to claim 1, further comprising:
   correction means that makes a correction for increase with respect to a preset injection amount of the fuel to be injected from the exhaust-side fuel injection valve according to the clogging degree of the injection port, which is estimated by the estimation means.

4. The exhaust purification system for an internal combustion engine according to claim 3,
   wherein the correction means makes a correction for increase with respect to the preset injection amount by increasing injection time period of the exhaust-side fuel injection valve.

* * * * *